(12) United States Patent
Takizawa et al.

(10) Patent No.: US 12,249,889 B2
(45) Date of Patent: Mar. 11, 2025

(54) MAGNETIC-GEARED MOTOR WITH DIVISIONAL SPACERS

(71) Applicant: Mitsubishi Electric Corporation, Tokyo (JP)

(72) Inventors: Yuji Takizawa, Tokyo (JP); Haruyuki Kometani, Tokyo (JP); Ryoji Miyatake, Tokyo (JP); Takuro Yamada, Tokyo (JP); Kenji Tanaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 269 days.

(21) Appl. No.: 17/791,905

(22) PCT Filed: Apr. 16, 2020

(86) PCT No.: PCT/JP2020/016672
§ 371 (c)(1),
(2) Date: Jul. 11, 2022

(87) PCT Pub. No.: WO2021/210119
PCT Pub. Date: Oct. 21, 2021

(65) Prior Publication Data
US 2022/0407402 A1   Dec. 22, 2022

(51) Int. Cl.
*H02K 49/10* (2006.01)
*H02K 9/22* (2006.01)

(52) U.S. Cl.
CPC .......... *H02K 49/102* (2013.01); *H02K 9/223* (2021.01)

(58) Field of Classification Search
CPC ...... H02K 49/102; H02K 49/10; H02K 16/02; H02K 9/223; H02K 1/246; H02K 1/276
(Continued)

(56) References Cited

U.S. PATENT DOCUMENTS

| 2010/0289365 A1* | 11/2010 | Bando ................... H02K 16/00 310/156.01 |
| 2012/0194021 A1* | 8/2012 | Nakatsugawa ...... H02K 49/102 310/103 |

(Continued)

FOREIGN PATENT DOCUMENTS

| JP | 2010017031 A * | 1/2010 |
| JP | 5286373 B2 | 9/2013 |

(Continued)

OTHER PUBLICATIONS

Machine translation of JP-2016135014-A. (Year: 2016).*
(Continued)

*Primary Examiner* — Michael Andrews
(74) *Attorney, Agent, or Firm* — XSENSUS LLP

(57) ABSTRACT

Provided is a magnetic-geared motor that can suppress eddy current flowing inside a fastening member and reduce power loss. The magnetic-geared motor includes: a stator; a first rotor provided rotatably relative to the stator and including a plurality of magnetic pole pieces and a plurality of spacers disposed so as to be arranged in a circumferential direction; and a second rotor provided coaxially with the first rotor. Each spacer is composed of a plurality of divisional spacers disposed apart from each other in an axial direction, and a plurality of fastening tools for fastening the plurality of divisional spacers in the axial direction, and the divisional spacers and the fastening tools are electrically insulated from each other.

10 Claims, 4 Drawing Sheets

(58) Field of Classification Search
USPC .......................................................... 310/103
See application file for complete search history.

(56) References Cited

U.S. PATENT DOCUMENTS

| | | | | |
|---|---|---|---|---|
| 2013/0119789 | A1* | 5/2013 | Maekawa | ............... H02K 21/12 |
| | | | | 310/46 |
| 2018/0269770 | A1* | 9/2018 | Powell | ................. H02K 49/102 |
| 2022/0052596 | A1* | 2/2022 | Ukaji | ..................... H02K 7/116 |

FOREIGN PATENT DOCUMENTS

| | | | |
|---|---|---|---|
| JP | 2016135014 A | * | 7/2016 |
| JP | 6403329 B2 | | 10/2018 |

OTHER PUBLICATIONS

Machine translation of JP-2010017031-A. (Year: 2010).*
International Search Report and Written Opinion mailed on Jun. 23, 2020, received for PCT Application PCT/JP2020/016672, filed on Apr. 16, 2020, 9 pages including English Translation.

* cited by examiner

MAGNETIC-GEARED MOTOR WITH DIVISIONAL SPACERS

CROSS-REFERENCE TO RELATED APPLICATION

The present application is based on PCT filing PCT/JP2020/016672, filed Apr. 16, 2020, the entire contents of which are incorporated herein by reference.

TECHNICAL FIELD

The present disclosure relates to a magnetic-geared motor.

BACKGROUND ART

As an electric generator of a wind power generation device, a magnetic-geared motor having a magnetic speed reducer and a motor integrated with each other is used. The magnetic-geared motor is composed of a low-speed rotor, a high-speed rotor provided coaxially with the low-speed rotor, and a stator having a stator coil and a permanent magnet. In a case where the magnetic-geared motor is used as an electric generator of a wind power generation device, the low-speed rotor rotates in conjunction with a wind mill and induced power is generated in the stator coil through rotation of the low-speed rotor, whereby power generation is performed.

In the low-speed rotor, a plurality of magnetic pole pieces are disposed in the circumferential direction. One magnetic pole piece is formed by stacking a plurality of thin-plate-shaped electromagnetic steel sheets in the axial direction. As a method for fixing the magnetic pole pieces in the axial direction, disclosed is a method in which metal bar-shaped fastening members are disposed in the circumferential direction between a plurality of magnetic pole pieces, and metal end plates are provided at both ends in the axial direction. The end plates at both ends are fastened in the axial direction by the fastening members, whereby the magnetic pole pieces are fixed in the axial direction. In the low-speed rotor configured as described above, a current loop that circulates between the metal fastening members and the end plates is formed, and induced current is generated in the current loop during rotation. In particular, in high-speed rotation, the induced current increases, so that power loss in the magnetic-geared motor increases.

Regarding such a problem, in a conventional magnetic-geared motor, disclosed is a method in which insulation members are provided between fastening members and one end plate, thereby interrupting the current loop that circulates between the fastening members and the end plates (see, for example, Patent Document 1).

CITATION LIST

Patent Document

Patent Document 1: Japanese Patent No. 5286373

SUMMARY OF THE INVENTION

Problems to be Solved by the Invention

However, in the conventional magnetic-geared motor, eddy current induced inside the fastening member forms one large loop of current flowing through the entire fastening member which is long in the axial direction. Thus, there is a problem that power loss due to eddy current flowing inside the fastening member cannot be suppressed.

The present disclosure has been made to solve the above problem, and an object of the present disclosure is to provide a magnetic-geared motor that can suppress eddy current flowing inside a fastening member and reduce power loss.

Solution to the Problems

A magnetic-geared motor according to the present disclosure includes: a stator including a stator coil and a stator permanent magnet; a first rotor provided rotatably relative to the stator with a first gap from the stator, the first rotor including a plurality of magnetic pole pieces disposed so as to be arranged in a circumferential direction and a plurality of spacers made of nonmagnetic metal and respectively disposed between the plurality of magnetic pole pieces; and a second rotor provided coaxially with the first rotor with a second gap from the first rotor, the second rotor including a plurality of rotor permanent magnets disposed so as to be arranged in the circumferential direction, wherein each spacer is composed of a plurality of divisional spacers disposed apart from each other in an axial direction, and a plurality of fastening tools for fastening the plurality of divisional spacers in the axial direction, and the divisional spacers and the fastening tools are electrically insulated from each other.

Effect of the Invention

The magnetic-geared motor according to the present disclosure includes the spacers composed of the plurality of divisional spacers disposed apart from each other in the axial direction and the plurality of fastening tools for fastening the plurality of divisional spacers in the axial direction, and the divisional spacers and the fastening tools are electrically insulated from each other. Since the spacer which is a fastening member and the fastening tool are electrically insulated from each other, eddy current flowing inside the fastening member is divided into a plurality of eddy currents. As a result, eddy current flowing inside the fastening member can be suppressed and power loss can be reduced.

DESCRIPTION OF EMBODIMENTS

Figure 1:
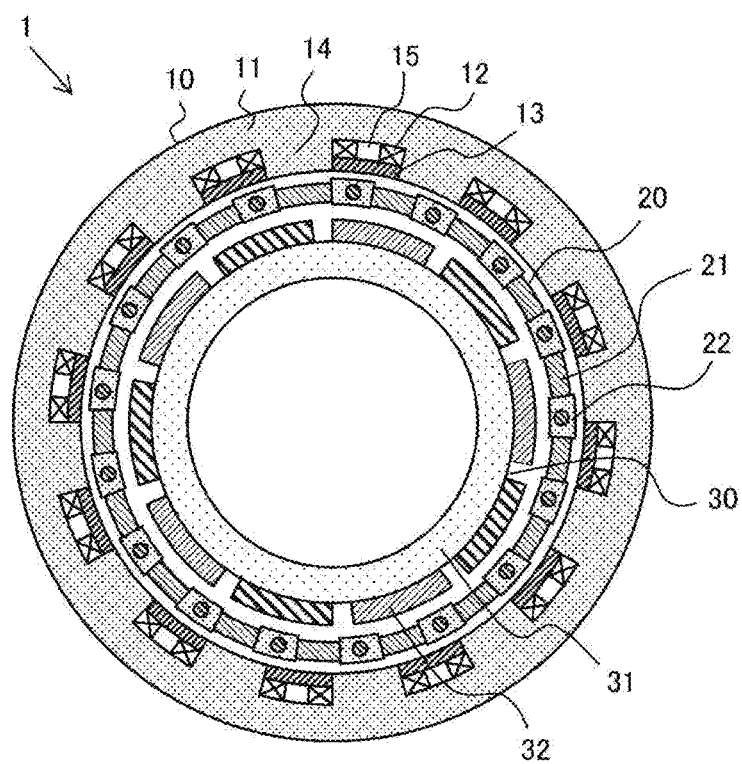
FIG. 1 is a schematic sectional view of a magnetic-geared motor according to embodiment 1.

Hereinafter, a magnetic-geared motor according to embodiments for carrying out the present disclosure will be described in detail with reference to the drawings. In the drawings, the same reference characters denote the same or corresponding parts.

Embodiment 1

FIG. 1 is a schematic sectional view of a magnetic-geared motor according to embodiment 1. FIG. 1 is a schematic sectional view along a plane perpendicular to the axial direction of the magnetic-geared motor. The magnetic-geared motor 1 of the present embodiment includes a stator 10, a low-speed rotor 20 provided rotatably relative to the stator 10 with a gap from the stator 10, and a high-speed rotor 30 provided coaxially with the low-speed rotor 20 with a gap therefrom. The stator 10, the low-speed rotor 20, and the high-speed rotor 30 have cylindrical shapes and are disposed coaxially with each other. In the magnetic-geared motor 1 of the present embodiment, the stator 10, the low-speed rotor 20, and the high-speed rotor 30 are disposed in this order from the outer diameter side.

The stator 10 includes a stator core 11 having a cylindrical shape, a stator coil 12, and a stator permanent magnet 13. The stator core 11 has 12 teeth 14 protruding to the inner circumferential side, and 12 slots 15 are formed between the teeth 14. The stator coil 12 and the stator permanent magnet 13 are disposed in each slot 15.

The low-speed rotor 20 having a cylindrical shape includes a plurality of magnetic pole pieces 21 disposed so as to be arranged in the circumferential direction, and a plurality of nonmagnetic metal spacers 22 disposed between the plurality of magnetic pole pieces 21. 17 magnetic pole pieces 21 and 17 spacers 22 are provided.

The high-speed rotor 30 includes a high-speed rotor core 31 having a cylindrical shape, and 10 rotor permanent magnets 32 disposed so as to be arranged in the circumferential direction on the outer circumferential surface of the high-speed rotor core 31. The magnetic-geared motor 1 of the present embodiment is a so-called 10-pole 12-slot magnetic-geared motor. The speed increase ratio determined by the number of magnetic pole pieces/the number of pole pairs is 17/5, i.e., 3.4, and the high-speed rotor 30 rotates at 3.4 times the rotation speed of the low-speed rotor 20.

Figure 2:
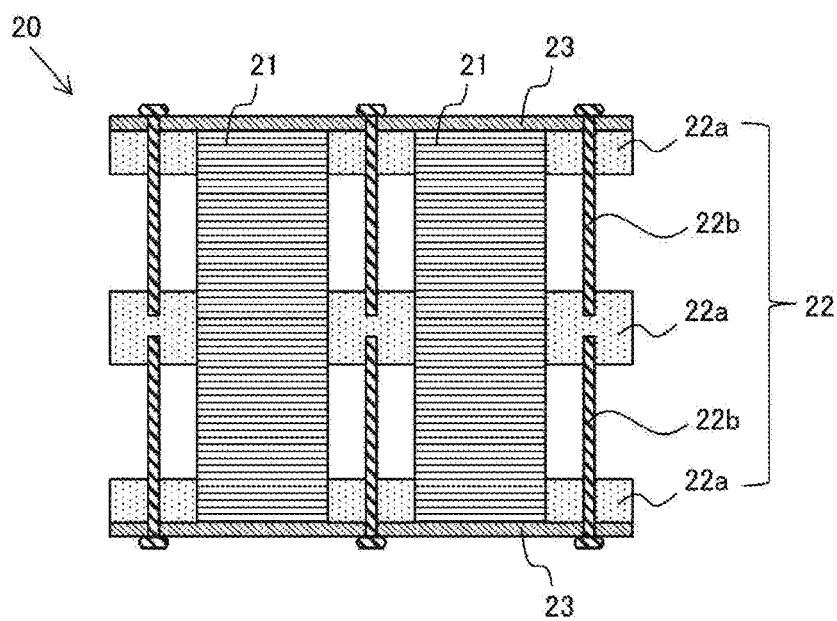
FIG. 2 is a side view of a low-speed rotor according to embodiment 1.

FIG. 2 is a side view of the low-speed rotor 20 in the present embodiment. FIG. 2 is a side view when the magnetic-geared motor 1 is seen from the inner diameter side. In FIG. 2, the vertical direction is the axial direction of the magnetic-geared motor 1, and the horizontal direction is the circumferential direction. The low-speed rotor 20 includes the plurality of magnetic pole pieces 21 and the plurality of nonmagnetic metal spacers 22 disposed so as to be arranged in the circumferential direction. One magnetic pole piece 21 is formed by stacking a plurality of thin-plate-shaped electromagnetic steel sheets in the axial direction. As a material of the spacer 22, nonmagnetic stainless steel, titanium, aluminum, brass, copper, or the like may be used. The spacer 22 is composed of a plurality of divisional spacers 22a disposed apart from each other in the axial direction, and a plurality of fastening tools 22b for fastening the plurality of divisional spacers 22a in the axial direction. As a method for fastening the divisional spacers 22a in the axial direction using the fastening tools 22b, for example, a fastening method using screws may be used. The plurality of divisional spacers 22a are in contact with the magnetic pole pieces 21 in the circumferential direction. Clampers 23 having an annular shape are disposed at both ends in the axial direction of the low-speed rotor 20. The fastening tools 22b at both ends in the axial direction fasten the plurality of divisional spacers 22a with the clampers 23 therebetween. The clampers 23 fix the electromagnetic steel sheets stacked as the magnetic pole pieces 21, in the stacking direction.

Figure 3:
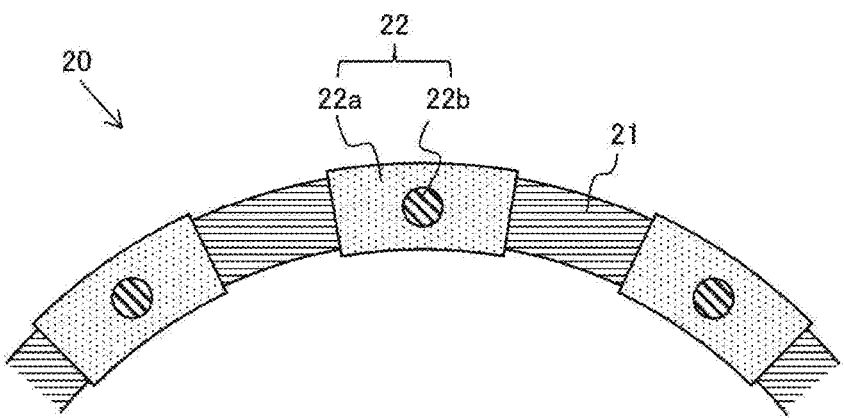
FIG. 3 is a top view of the low-speed rotor according to embodiment 1.

FIG. 3 is a top view of the low-speed rotor 20 in the present embodiment. In FIG. 3, the clampers 23 are not shown. As shown in FIG. 3, the low-speed rotor 20 is formed in a cylindrical shape by the plurality of magnetic pole pieces 21 and the plurality of spacers 22 disposed so as to be arranged in the circumferential direction.

In the low-speed rotor 20 of the present embodiment, the divisional spacer 22a and the fastening tool 22b are electrically insulated from each other. As a method for electrically insulating the divisional spacer 22a and the fastening tool 22b from each other, for example, a sheet-shaped insulation member may be inserted between contact surfaces of the divisional spacer 22a and the fastening tool 22b. As the sheet-shaped insulation member, for example, a silicone rubber film may be used. As another method, insulation treatment may be performed on the surface of at least one of the divisional spacer 22a and the fastening tool 22b. As a method for performing insulation treatment on the surface of such a metal member, for example, insulation varnish may be applied to the surface of the metal member, or insulating ceramic or resin may be sprayed on the surface of the metal member.

In the low-speed rotor 20 of the present embodiment, the spacer is formed by the plurality of divisional spacers 22a disposed apart from each other and the plurality of fastening tools 22b for fastening the plurality of divisional spacers 22a in the axial direction. Therefore, the sum of the axial-direction lengths of the plurality of fastening tools 22b is greater than the sum of the axial-direction lengths of the plurality of divisional spacers 22a.

In the magnetic-geared motor configured as described above, eddy current induced inside the spacer 22 which is a fastening member occurs as divided eddy currents at the respective insides of the divisional spacer 22a and the fastening tool 22b. This is because the divisional spacer 22a and the fastening tool 22b are electrically insulated from each other. Therefore, the eddy currents induced in the spacer 22 do not form one large loop that is long in the axial direction. In a case of a fastening member having the same axial-direction length, the total current amount of eddy currents when a plurality of short divided loops are formed is smaller than the current amount of eddy current when one large loop that is long in the axial direction is formed. Thus, the magnetic-geared motor of the present embodiment can suppress power loss due to eddy current.

In the magnetic-geared motor of the present embodiment, the configuration in which the stator 10, the low-speed rotor 20, and the high-speed rotor 30 are provided in this order from the outer diameter side, has been shown. However, the present disclosure is not limited to this configuration. In addition, the magnetic-geared motor of the present embodiment is not limited to a 10-pole 12-slot magnetic-geared motor.

In the magnetic-geared motor of the present embodiment, the electromagnetic steel sheets stacked as the magnetic pole pieces 21 are fixed in the stacking direction, using the clampers 23. As another fixation method, the stacked electromagnetic steel sheets may be fixed in the stacking direction by swaging. In this case, the clampers 23 may be eliminated.

Embodiment 2

A magnetic-geared motor used as an electric generator of a wind power generation device has a large size with a diameter of several meters. Therefore, a plurality of separated segments of a rotor may be manufactured, and at the time of instalment, the segments may be integrated to form the rotor.

Figure 4:
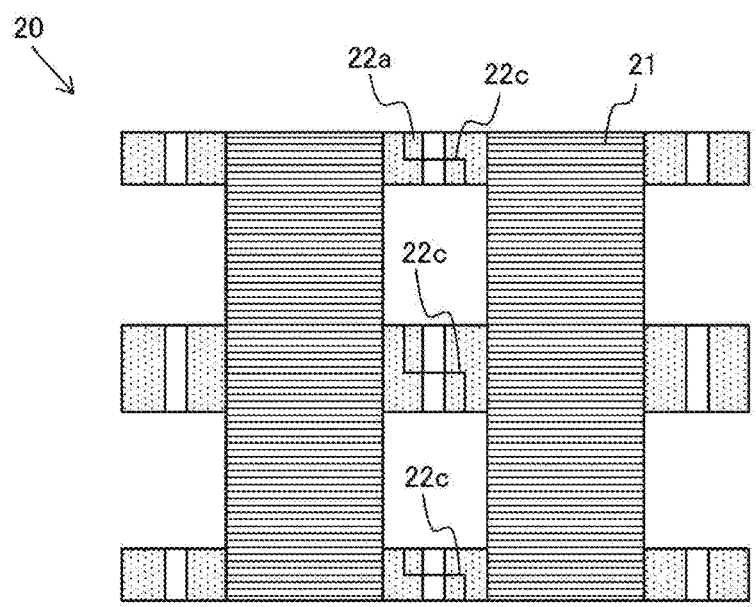
FIG. 4 is a schematic view of a low-speed rotor according to embodiment 2.
Figure 4:
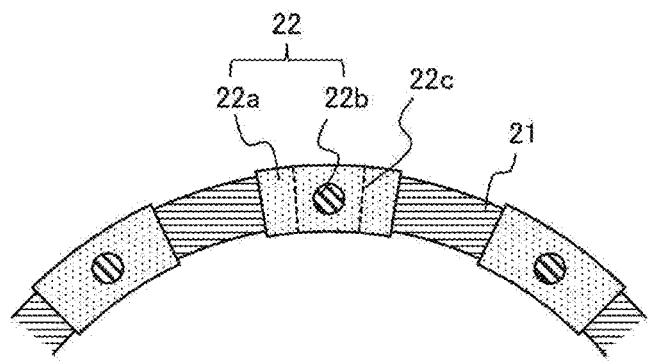

FIG. 4 is a schematic view of a low-speed rotor according to embodiment 2. In FIG. 4, the upper view is a side view of the low-speed rotor in the present embodiment, and the lower view is a top view thereof. In the upper view in FIG. 4, the fastening tools and the clampers are not shown. In the lower view in FIG. 4, the clampers are not shown. In the low-speed rotor 20 of the present embodiment, among the spacers 22 disposed in the circumferential direction, for example, the spacers 22 at four positions away from each other by 90 degrees are configured to be separable from each other in the circumferential direction.

As shown in the upper view in FIG. 4, the plurality of divisional spacers 22a arranged in the axial direction in one spacer 22 are configured to be separable to the upper and lower sides at circumferential-direction division planes 22c so that the low-speed rotor 20 can be separated in the circumferential direction. The low-speed rotor 20 configured as described above can be separated into a plurality of segments. As shown in the lower view in FIG. 4, the plurality of segments are fastened in the circumferential direction by the fastening tools 22b, thus forming the low-speed rotor 20.

In the magnetic-geared motor configured as described above, assemblability is improved, and in a case where there is a defect in any divided segment, only that segment can be replaced. In addition, in a case of a large-sized magnetic-geared motor, the transportation cost is possibly reduced by transporting the low-speed rotor as divided segments.

Embodiment 3

Figure 5:
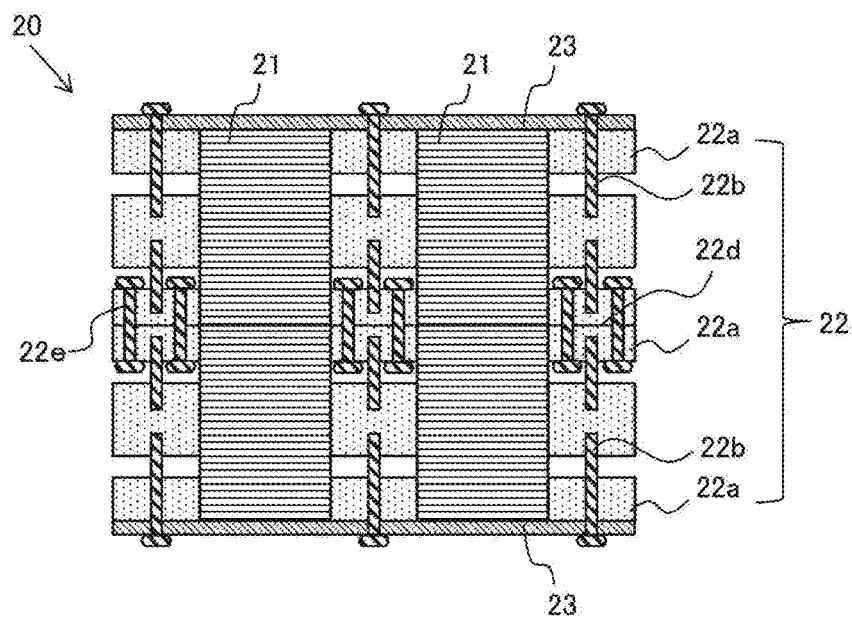
FIG. 5 is a side view of a low-speed rotor according to embodiment 3.

FIG. 5 is a side view of a low-speed rotor according to embodiment 3. The low-speed rotor 20 of the present embodiment is configured to be separable into a plurality of segments in the axial direction. As shown in FIG. 5, the divisional spacers 22a arranged in the circumferential direction are configured to be separable to the upper and lower sides at an axial-direction division plane 22d so that the divisional spacers 22a can be separated in the axial direction. The divisional spacers 22a separable in the axial direction are provided to all the spacers 22. At the same time, the magnetic pole pieces 21 are also configured to be separable in the axial direction at the axial-direction division plane 22d.

The low-speed rotor 20 configured as described above can be separated into two segments in the axial direction. As shown in FIG. 5, the two segments form the low-speed rotor 20 by fastening the separated divisional spacers 22a in the axial direction using second fastening tools 22e.

In the magnetic-geared motor configured as described above, assemblability is improved, and in a case where there is a defect in any divided segment, only that segment can be replaced. In addition, in a case of a large-sized magnetic-geared motor, the transportation cost is possibly reduced by transporting the low-speed rotor as divided segments.

Figure 6:
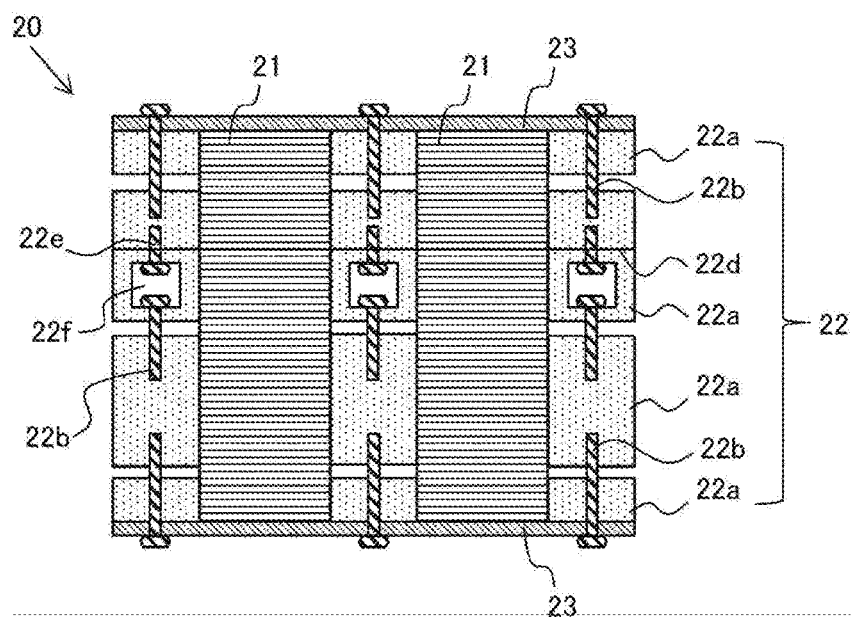
FIG. 6 is a side view of the low-speed rotor according to embodiment 3.

FIG. 6 is a side view of another low-speed rotor according to embodiment 3. In the low-speed rotor 20 shown in FIG. 6, a cavity 22f is formed in one of the divisional spacers 22a separable at the axial-direction division surface 22d. Using the cavity 22f, the separated divisional spacers 22a are fastened by the second fastening tool 22e.

In the magnetic-geared motor configured as described above, assemblability is improved, and in a case where there is a defect in any divided segment, only that segment can be replaced. In addition, in a case of a large-sized magnetic-geared motor, the transportation cost is possibly reduced by transporting the low-speed rotor as divided segments.

In the present embodiment, the method in which the low-speed rotor is separated into two segments in the axial direction, has been described. However, the low-speed rotor may be separated into three or more segments in the axial direction.

Embodiment 4

Figure 7:
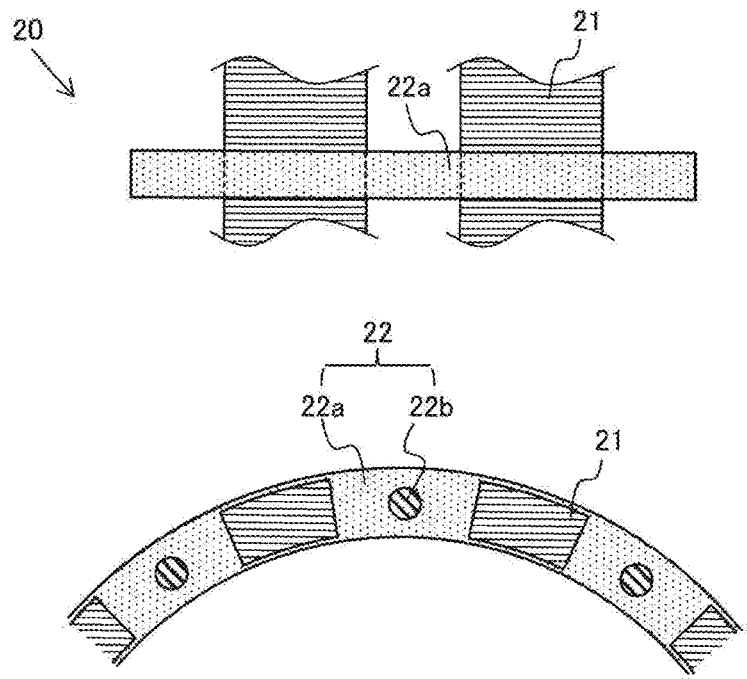
FIG. 7 is a schematic view of a low-speed rotor according to embodiment 4.

FIG. 7 is a schematic view of a low-speed rotor according to embodiment 4. In FIG. 7, the upper view is a side view of the low-speed rotor in the present embodiment, and the lower view is a top view thereof. As shown in FIG. 7, in the low-speed rotor 20 of the present embodiment, the divisional spacers 22a disposed so as to be arranged in the circumferential direction are integrated with each other on the inner diameter side and the outer diameter side.

In the low-speed rotor 20 configured as described above, there is no step between the divisional spacer 22a and the magnetic pole piece 21, so that the air resistance of the low-speed rotor 20 can be reduced. As a result, rotation efficiency of the low-speed rotor 20 is improved and noise can be reduced. In addition, since rigidity of the divisional spacers 22a can be increased, rigidity of the entire low-speed rotor 20 also increases. Further, when the magnetic-geared motor is assembled, the low-speed rotor is inserted between the stator and the high-speed rotor. At this time, there is a possibility that the low-speed rotor comes into contact with the stator or the high-speed rotor, due to an attraction force from a stator permanent magnet and a rotor permanent magnet. By using the divisional spacers 22a of the present embodiment, it is also possible to prevent damage of the magnetic pole pieces 21 due to contact with the stator or the high-speed rotor.

In the present embodiment, the divisional spacers 22a are integrated with each other on the inner diameter side and the outer diameter side. In an alternative configuration, nonmagnetic metal thin plates which are separate parts from the divisional spacers 22a may be disposed between the divisional spacers 22a. In the low-speed rotor 20 configured as described above, there is no step between the divisional spacer 22a and the magnetic pole piece 21, so that the air resistance of the low-speed rotor 20 can be reduced. From the standpoint of preventing damage of the magnetic pole pieces due to contact with the stator or the high-speed rotor at the time of assembly, the nonmagnetic metal thin plates may be detached after assembly.

Embodiment 5

Figure 8:
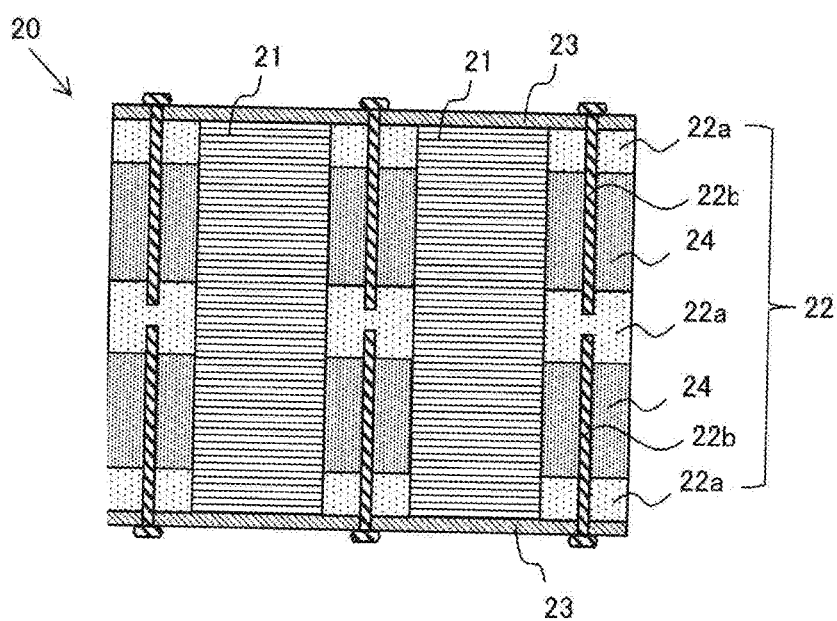
FIG. 8 is a side view of a low-speed rotor according to embodiment 5.

FIG. 8 is a side view of a low-speed rotor according to embodiment 5. In the low-speed rotor of the present embodiment, the spacer is provided with a heat dissipation member. As shown in FIG. 8, in the low-speed rotor 20 of the present embodiment, nonmagnetic heat dissipation members 24 are provided between the plurality of divisional spacers 22a disposed apart from each other in the axial direction. The heat dissipation members 24 are in contact with the magnetic pole pieces 21 and the divisional spacers 22a. As a material of the heat dissipation member 24, a non-metal material, e.g., resin having high thermal conductivity may be used.

In the low-speed rotor 20 configured as described above, there is no gap between the divisional spacers 22a, so that the air resistance of the low-speed rotor 20 can be reduced. As a result, rotation efficiency of the low-speed rotor 20 is improved and noise can be reduced. In addition, since rigidity of the spacers 22 can be increased, rigidity of the entire low-speed rotor 20 also increases. Further, heat generated in the magnetic pole pieces 21 and the divisional spacers 22*a* can be dissipated via the heat dissipation members 24.

In the present embodiment, since the spacers 22 are provided with the heat dissipation members 24, the weight of the low-speed rotor 20 increases. When the weight of the low-speed rotor 20 increases, rotation efficiency of the low-speed rotor 20 is reduced. Therefore, it is preferable that the material of the heat dissipation member 24 has a small specific weight. Further, for reducing the weight of the heat dissipation member 24, the heat dissipation member 24 may have a hollow structure or a structure including a cutout.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 magnetic-geared motor
10 stator
11 stator core
12 stator coil
13 stator permanent magnet
14 tooth
15 slot
20 low-speed rotor
21 magnetic pole piece
22 spacer
22*a* divisional spacer
22*b* fastening tool
22*c* circumferential-direction division surface
22*d* axial-direction division surface
22*e* second fastening tool
22*f* cavity
23 clamper
24 heat dissipation member
30 high-speed rotor
31 high-speed rotor core
32 rotor permanent magnet

The invention claimed is:

1. A magnetic-geared motor comprising:
a stator including a stator coil and a stator permanent magnet;
a first rotor provided rotatably relative to the stator with a first gap from the stator, the first rotor including:
a plurality of magnetic pole pieces disposed so as to be arranged in a circumferential direction; and
a plurality of spacers made of nonmagnetic metal and respectively disposed between the plurality of magnetic pole pieces; and
a second rotor provided coaxially with the first rotor with a second gap from the first rotor, the second rotor including a plurality of rotor permanent magnets disposed so as to be arranged in the circumferential direction, wherein
each spacer includes:
a plurality of divisional spacers disposed apart from each other in an axial direction; and
a plurality of fastening tools, each fastening tool fastening two divisional spacers among the plurality of divisional spacers together in the axial direction, and
the plurality of divisional spacers and the plurality of fastening tools are electrically insulated from each other.

2. The magnetic-geared motor according to claim 1, wherein
the plurality of divisional spacers included in at least one of the plurality of spacers are separable in the circumferential direction.

3. The magnetic-geared motor according to claim 2, wherein
at least one of the plurality of divisional spacers is separable in the axial direction.

4. The magnetic-geared motor according to claim 3, wherein
each spacer includes a nonmagnetic heat dissipation member between the plurality of divisional spacers disposed apart from each other in the axial direction.

5. The magnetic-geared motor according to claim 2, wherein
each spacer includes a nonmagnetic heat dissipation member between the plurality of divisional spacers disposed apart from each other in the axial direction.

6. The magnetic-geared motor according to claim 1, wherein
at least one of the plurality of divisional spacers is separable in the axial direction.

7. The magnetic-geared motor according to claim 6, wherein
each spacer includes a nonmagnetic heat dissipation member between the plurality of divisional spacers disposed apart from each other in the axial direction.

8. The magnetic-geared motor according to claim 1, wherein
the plurality of divisional spacers arranged in the circumferential direction are formed integrally with each other.

9. The magnetic-geared motor according to claim 8, wherein
each spacer includes a nonmagnetic heat dissipation member between the plurality of divisional spacers disposed apart from each other in the axial direction.

10. The magnetic-geared motor according to claim 1, wherein
each spacer includes a nonmagnetic heat dissipation member between the plurality of divisional spacers disposed apart from each other in the axial direction.

* * * * *